United States Patent [19]

van Kuijeren

[11] Patent Number: 4,728,440
[45] Date of Patent: Mar. 1, 1988

[54] APPARATUS AND METHOD FOR REMOVING A LIQUID FROM A MIXTURE OF LIQUIDS

[75] Inventor: Herman C. van Kuijeren, Heerhugowaard, Netherlands

[73] Assignee: Hoogovens Groep B.V., Ijmuiden, Netherlands

[21] Appl. No.: 917,613

[22] Filed: Oct. 10, 1986

[30] Foreign Application Priority Data

Oct. 14, 1985 [NL] Netherlands .......................... 8502799

[51] Int. Cl.⁴ ..................... B01D 17/02; B01D 17/032
[52] U.S. Cl. .................................... 210/744; 210/800; 210/104; 210/221.1; 210/525; 210/540; 210/923
[58] Field of Search ............ 210/121, 104, 923, 221.1, 210/97, 800, 513, 525, 538, 540, 744

[56] References Cited

U.S. PATENT DOCUMENTS 4,110,215 8/1978 Bramlett .............................. 210/121
4,469,170 9/1984 Farmer ................................ 210/104

FOREIGN PATENT DOCUMENTS 123947 12/1959 U.S.S.R. .............................. 210/121

Primary Examiner—Frank Sever
Attorney, Agent, or Firm—Stevens, Davis, Miller & Mosher

[57] ABSTRACT

Apparatus for removing a liquid from a mixture of liquids in a collecting tank has a drain box in the collecting tank having a weir for passage of liquid being removed into the drain box and a conduit for discharge of the liquid from the drain box. The drain box is movable up and down in the tank. To improve the separation of the liquids by control of the position of the weir, the vertical location of the drain box in the tank is determined by height-adjusting means connected to the drain box. the height-adjusting means is controlled in dependence on the output of a sensor sensing the level of liquid in the drain box.

12 Claims, 2 Drawing Figures

APPARATUS AND METHOD FOR REMOVING A LIQUID FROM A MIXTURE OF LIQUIDS

BACKGROUND OF THE INVENTION

1. Field of the Invention

The invention relates to apparatus for removing a liquid from a mixture of liquids, in particular separating immiscible liquid of differing densities for example oil from a mixture of oil and water, comprising a collecting tank for the mixture of liquids and an overflow, a drain box with a weir arranged in the collecting tank, the liquid to be separated passing over the weir into the drain box. In addition the invention relates to a method for operation of this apparatus.

2. Description of the Prior Art

Such separation installations are known in many branches of industry. Separation installations for removing oil from water/oil mixtures are used in sea-going and inland waterways vessels to treat the water found in the bilges, and in industry for the regeneration of oil from an oil/water mixture.

An example of the latter application can be found in the steel industry, where in the cold rolling process oil, which is provided during rolling to limit friction losses, is mixed with cooling water which is sprayed onto the rolls. The cooling water sprayed onto the rolls and the oil both form part of a single circulation system. That means that the cooling water is collected in a collecting tank to cool down after being sprayed on the rolls, after which following cleaning it is used again. The high cost of the oil used together with the large consumption (for example 4900 litres per day) makes the recovery of this oil economically very desirable.

In one known technique this recovery is carried out in two stages. The liquid running over the weir of separating apparatus as described above is subjected to a centrifuge process in two stages. The first centrifuge operation serves to separate from the oil the water that has accidently run over the weir. The quantity of water which accidentally passes over the weir is particularly great with respect to the quantity of oil; it amounts for example to approximately eight times the quantity of oil. The second centrifuge stage serves to remove other impurities from the oil. The centrifuge capacity required is largely determined by the quantity of liquid to be processed in the first process stage. In practice, this first process stage accounts for 80% of the capacity. In view of the costs involved in centrifuging, and in the further finishing of the separated water, one object of the present invention is to reduce the quantity of water relative to the quantity of oil passing over the overflow. As a result the centrifuge capacity required, in particular in the first process stage, will be reduced and in addition the finishing costs of the separated water will fall.

A second object of the invention relates to the reduction of the thickness of the layer of oil floating in the collecting tank. The aim is that the water removed from the collecting tank will contain less oil than in the known apparatus. The water from the collecting tank is in practice used as cooling water during rolling. Too much oil in the cooling water results in a reduction in the cooling effect because the used oil has the property of forming a skin around the water droplets, which makes it more difficult for heat to be transferred from the roll to the water.

FR-A-No. 2 426 288 describes apparatus for separating liquids in which a drain box floats in the liquid mixture in a container. The top edge i.e. the weir, of the drain box is movable relative to the rest of the drain box. A float on the liquid level in the drain box controls the position of the top edge. Thus when the drain box becomes fuller and sinks lower in the liquid mixture, the weir level rises relative to the bottom of the drain box, with the aim of preventing excessive flow of liquid into the drain box. This apparatus does not permit precise control of the flow of liquid into the drain box.

SUMMARY OF THE INVENTION

The invention has the object of solving the above-mentioned problems, and obtaining the benefits which can be achieved thereby.

The apparatus for removing a liquid from a mixture of liquids in accordance with the invention is characterised in that the drain box is located in the collecting tank by height-adjusting means which determines the vertical location of the drain box. In contrast to the apparatus of FR-A-No. 2 426 288 described above, in the present invention the vertical location of the drain box as a whole is determined by the height-adjusting means relative to a fixed datum level. The drain box is not freely floating in the liquid mixture, but is supported by the height adjusting means. This has the advantage that the position of the weir can be well adapted to changes in the liquid level in the collecting tank and to changes in the liquid level in the drain box, as a result of which it is possible to achieve good adjustment of the weir over which the floating liquid flows from the collecting tank into the drain box relative to the boundary level of the mixed liquids.

The invention also has the important advantage in a circulation system for cooling of the rolls in a cold rolling process that by giving a good separation of oil and water, cooling of the rolls is properly maintained as a result of which the profile of the roll will not show any great variations, so that shape problems in the rolled material can be reduced or prevented.

It is preferable for the drain box to consist of a bottom and upright side walls, of which at least one side wall is lower than the other or others in order to form the weir for the liquid to be removed to flow into the drain box. This has the advantage that the overflow function is less sensitive to the position of the box relative to the liquid level, where the top edge of this lower side wall remains parallel to the boundary of the liquids.

It is preferable for the apparatus to be provided with sensing means for measuring the liquid level in the drain box, the sensing means being coupled to the height-adjusting means by control means which converts the measured liquid level signal into a signal for control of the height-adjusting means. With this, the height adjustment of the drain box need not be carried out by human intervention, which would otherwise have to be carried out at regular intervals. A fully automatically operating separation system for liquids is thus possible, as a result of which the disruptive effect of differences in height of the liquid level in the collecting tank can be simply compensated for. These differences in height are caused in a cold rolling process by very frequent starting and stopping of roll cooling as a result of which the level in the collecting tank can change considerably e.g. by up to 8 cm.

It is recommended that the bottom of the drain box be flat. This has the advantage that conversion of the liquid level signal by the control device into a signal for vertical movement of the drain box is linear, which means that the conversion is not in itself dependent on the liquid level.

It is preferable for the liquid level in the drain box to be sensed by a float, which is coupled e.g. by a rod to an element, for example a linear position sensor, which gives a signal which is a measure of the vertical displacement of the float.

The invention also provides a method of operating apparatus of the invention as described above, e.g. to separate oil and water, comprising the steps of (a) measuring the liquid level in the drain box to provide an output signal which is a measure of the liquid level, (b) processing the output signal to obtain a control signal for the height-adjusting means, (c) operating the height-adjusting means in dependence on the control signal to adjust the vertical location of the drain box, and continuing this adjustment until the liquid level in the box reaches a desired level.

This method gives the advantage that the speed at which the oil is skimmed off is determined by the speed at which the liquid is drawn off from the drain box. This drawing off does in fact reduce the liquid level in the drain box, as a result of which the drain box is moved for as long as is necessary to restore the desired liquid level. When this required liquid level is constantly maintained, the quantity of liquid flowing into the drain box is equal to the quantity of liquid drawn off. It is preferable for the measured signal of the liquid level in the drain box to be processed so that a fall or increase in it gives a control signal which moves the drain box in a downward or upward directly respectively.

BRIEF INTRODUCTION OF THE DRAWINGS

The invention will be exemplified by a nonlimitative embodiment described below with reference to the accompanying drawings, in which:-

DESCRIPTION OF THE PREFERRED EMBODIMENT

Figure 1:
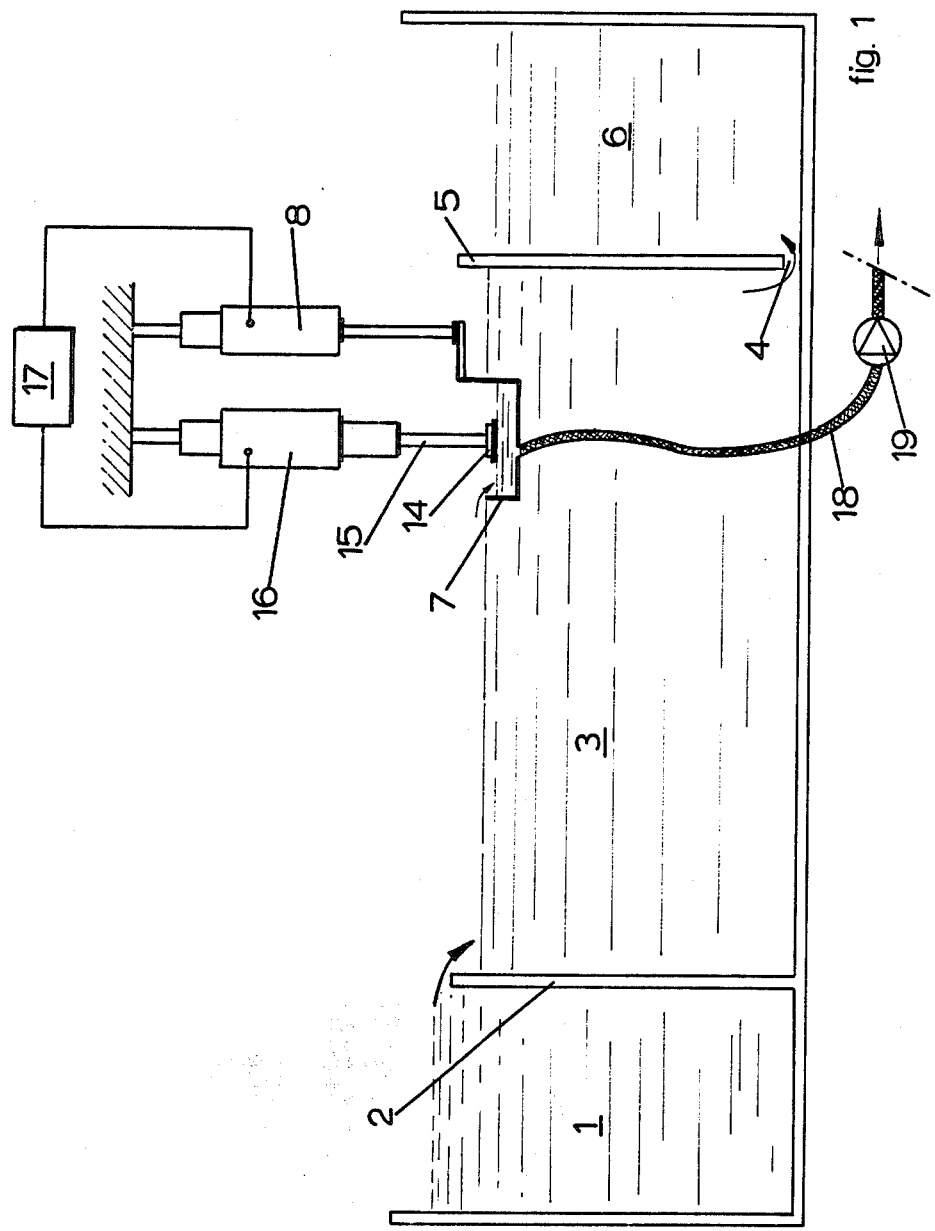
FIG. 1 shows apparatus embodying the invention including the collecting tank in which the drain box is arranged.

In the drawings, the invention is shown applied to oil/water separation in a coolant circulation system of a cold rolling mill. The oil/water mixture coming from the rolls is collected first in a receptacle 1. The mixture of liquids runs from this receptacle 1 over a dividing wall 2 into a collecting tank 3, which is sufficiently big to keep low the velocity of flow of the mixture of liquids. As a result the entrained dirt can sink and floating of the oil as a layer on the water takes place.

From the collecting tank 3 the water mainly separated from the oil passes into a suction tank 6 via an opening 4 in a dividing wall 5. The roll cooling water is taken from suction tank 6. During the time the cooling water remains in receptacle 1, the collecting tank 3, and the suction tank 6, a certain quantity of water evaporates, which must be topped up by adding extra water to these tanks (not shown).

In the collecting tank 3 near the dividing wall 5 a drain box 7 is arranged in the mixture of liquids.

The drain box 7 is connected via height-adjusting displacement device 8, in this case a piston-and-cylinder assembly, to a fixed datum level, e.g. a wall. The importance of this for good operation in accordance with the invention is that the drain box 7 does not float on the mixture of liquids, but can be given a desired position with respect to the fixed datum, which may be changed by adjustment of the displacement device 8.

Figure 2:
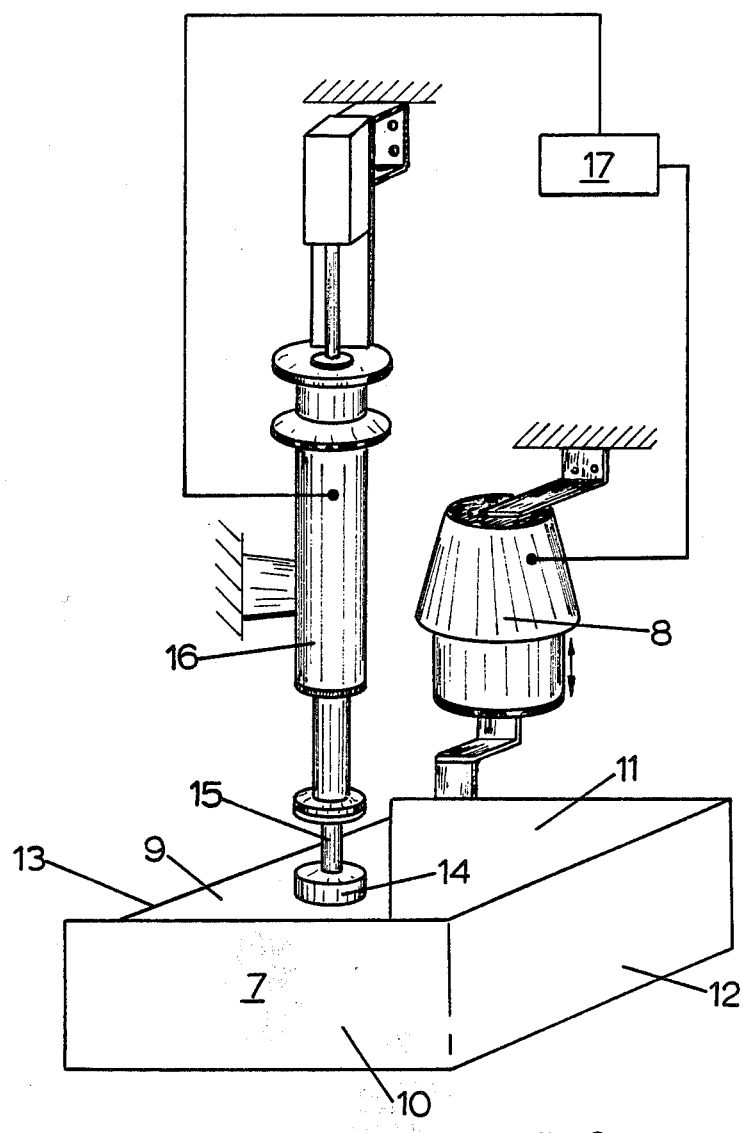
FIG. 2 shows the drain box in more detail with measuring means for the liquid level in the box, and height-adjusting means for moving the drain box.

FIG. 2 shows that one side wall 9 of drain box 7 is lower relative to the other side walls 10, 11 and 12. The drain box 7 is located by the displacement such that the top edge 13 of side wall 9 projects just above the oil/water boundary surface, and thus forms the weir for flow of mainly oil into the drain box. The bottom of the drain box is flat and horizontal. Liquid is sucked out of the drain box by a pump 19 via a flexible hose 18.

In order to quickly and accurately adjust to changes in the liquid level in the collecting tank 3, the positioning of the drain box 7 with respect to the oil/water boundary layer is automated. For this purpose a float 14 floats in the drain box 7 on the liquid which has run into the drain box 7. The height of the float 14 is a measure of the height of the liquid level in the drain box 7, and this is transferred via a rod 15 to a displacement sensor 16. The signal from the displacement sensor 16 is transmitted to a computing device 17, which converts this signal, which is a measure of the liquid level in the drain box 7, into a control signal which is transmitted to the displacement device 8.

If the level in the collecting tank rises, more liquid runs over the top edge 13 of the side wall 9 into the drain box 7 as a result of which the liquid level in the drain box 7 will rise. As a result float 14 also rises and the corresponding signal of the displacement sensor 16 is converted in computing device 17 into a control signal as a result of which the displacement device 8 lifts the drain box 7. The quantity of liquid flowing into the drain box falls as a result, until the desired level of the float 14 is again reached and then remains stable. In that case, the quantity of liquid flowing into the drain box is equal to the quantity of liquid which is removed from the drain box 7 at the bottom of the drain box 7 via the flexible hose 18 by the pump 19.

The liquid removed, largely oil, then undergoes several processes to make it suitable for re-use as a lubricant for rolling.

Advantage of the invention relate to the further removal of the water which has accidentally run into the drain box 7. In the known method, for each part of oil, eight parts of water passed into the drain box 7. With the embodiment of the invention illustrated, this ratio of oil to water is reduced to 1:1. This means large saving of running costs of centrifuging to separate the oil and water further, and in addition a saving of capital cost since the centrifuge capacity required is much less.

What is claimed is:

1. Apparatus for removing a liquid from a mixture of liquids comprising a collecting tank for the mixture of liquids, a drain box in the collecting tank, the drain box having a weir for passage of liquid being removed from the collecting tank into the drain box and a conduit extending from the drain box for discharge of the liquid from the drain box, height-adjusting means rigidly attached to the drain box for vertically moving the drain box in the collecting tank, means for sensing the level of liquid in the drain box and control means for said height-adjusting means operating in dependence on the liquid level measured by the sensing means.

2. Apparatus according to claim 1 wherein the sensing means includes a float and a sensing element coupled to the float, the sensing element providing an output signal dependent on the vertical displacement of the float.

3. Apparatus according to claim 2 wherein the drain box has a bottom and upright side walls, at least one side wall being lower than the other or others, so as to provide the weir for flow of liquid into the drain box.

4. Apparatus according to claim 2 wherein the drain box has a flat bottom.

5. Apparatus according to claim 1 wherein the drain box has a bottom and upright side walls, at least one side wall being lower than the other or others, so as to provide the weir for flow of liquid into the drain box.

6. Apparatus according to claim 1 wherein the drain box has a flat bottom.

7. Apparatus according to claim 1 wherein the drain box has a bottom and upright side wals, at least one side wall being lower than the other or others, so as to provide the weir for flow of liquid into the drain box.

8. Apparatus according to claim 1 wherein the drain box has a flat bottom.

9. Apparatus for separating a mixture of immiscible liquids of different densities comprising
   (a) a collecting tank for the mixture of liquids,
   (b) a drain box having a weir for flow of the liquid being separated into the drain box,
   (c) rigid support means for said drain box to locate said drain box in the collecting tank, the support means being adjustable to vary the vertical position of the drain box in the collecting tank,
   (d) control means to control the support means to vary the vertical position of the drain box,
   (e) sensing means for sensing the liquid level in the drain box and connected to the control means,
   (f) the control means controlling the support means in dependence on the liquid level sensed by the sensing means.

10. Method for removing a liquid from a mixture of liquids in a collection tank comprising the steps of
    (a) flowing a portion of said mixture of liquids in said collection tank into a drain box within said collection tank,
    (b) measuring the liquid level in the drain box to provide an output signal which is a measure of the liquid level,
    (c) providing a rigid height-adjusting means,
    (d) processing the output signal to obtain a control signal for said drain box height-adjusting means, and
    (e) operating the height-adjusting means in dependence on the control signal to adjust the vertical location of the drain box, and continuing this adjustment until the liquid level in the box reaches a desired level.

11. A method according to claim 10 wherein, in said processing of the output signal, output signals indicating respectively falling and rising of the liquid level in the drain box give control signals for movement of the drain box downwardly and upwardly respectively.

12. Method for removing a liquid from a mixture of liquids in a collection tank comprising flowing a portion of said mixture of liquid in said collection tank into a drain box within said collection tank and from which liquid flows, measuring the liquid level in the drain box, providing a rigid height-adjusting means and vertically moving the drain box with said rigid height-adjusting means until the liquid level in the box reaches a desired level.

* * * * *